United States Patent
Peng et al.

(10) Patent No.: US 6,689,451 B1
(45) Date of Patent: Feb. 10, 2004

(54) PRE-FINISHED AND DURABLE BUILDING MATERIAL

(75) Inventors: Weiling Peng, Murietta, CA (US); James A. Gleeson, Upland, CA (US); Donald J. Merkley, Alta Loma, CA (US)

(73) Assignee: James Hardie Research Pty Limited, Camellia (AU)

( * ) Notice: Subject to any disclaimer, the term of this patent is extended or adjusted under 35 U.S.C. 154(b) by 117 days.

(21) Appl. No.: 09/716,681

(22) Filed: Nov. 20, 2000

Related U.S. Application Data

(60) Provisional application No. 60/166,513, filed on Nov. 19, 1999.

(51) Int. Cl.[7] .................. B32B 13/02; B32B 13/10; B32B 25/02; B32B 25/10; B32B 27/04; B32B 27/12; B32B 3/26; B32B 27/08; B32B 27/42; E04B 9/00; E06B 3/54

(52) U.S. Cl. .................. 428/294.7; 428/297.1; 428/301.4; 428/320.2; 428/322.2; 428/503; 428/530; 52/474

(58) Field of Search .................. 428/294.7, 297.1, 428/301.4, 370.2, 322.2, 503, 530

(56) References Cited

U.S. PATENT DOCUMENTS

| | | | | |
|---|---|---|---|---|
| 3,663,341 A | * | 5/1972 | Veneziale, Jr. .................. 161/6 |
| 3,663,353 A | * | 5/1972 | Long et al. .................. 161/184 |
| 3,928,701 A | * | 12/1975 | Roehner .................. 428/222 |
| 1,512,084 A | * | 5/1978 | Arthur et al. | |
| 4,128,696 A | * | 12/1978 | Goebel et al. .................. 428/424 |
| 4,231,573 A | * | 11/1980 | Kelly .................. 473/117 |
| 4,337,290 A | * | 6/1982 | Kelly et al. .................. 428/201 |
| 4,379,553 A | * | 4/1983 | Kelly .................. 473/117 |
| 4,420,351 A | * | 12/1983 | Lussi et al. .................. 156/62.4 |
| 4,424,261 A | * | 1/1984 | Keeling et al. .................. 428/530 |
| 4,661,398 A | * | 4/1987 | Ellis .................. 442/295 |
| 4,670,079 A | * | 6/1987 | Thompson .................. 156/307.5 |
| 4,789,604 A | * | 12/1988 | van der Hoeven .................. 428/503 |
| 5,305,568 A | * | 4/1994 | Beckerman .................. 52/309.4 |
| 5,425,985 A | * | 6/1995 | Irvin .................. 428/283 |
| 5,425,986 A | | 6/1995 | Guyette .................. 428/283 |
| 5,561,173 A | * | 10/1996 | Dry .................. 523/218 |
| 5,928,777 A | * | 7/1999 | Cox et al. .................. 428/322.2 |
| 6,093,473 A | * | 7/2000 | Min .................. 428/147 |
| 6,176,920 B1 | * | 1/2001 | Murphy et al. .................. 106/711 |
| 6,367,208 B1 | * | 4/2002 | Campbell et al. .................. 52/169.13 |
| 6,423,167 B1 | * | 7/2002 | Palmer et al. .................. 156/209 |
| 6,514,624 B2 | * | 2/2003 | Takemoto .................. 428/447 |
| 6,551,694 B1 | * | 4/2003 | Imamichi et al. .................. 428/213 |

FOREIGN PATENT DOCUMENTS

| | | | |
|---|---|---|---|
| GB | 1 512 084 | * | 5/1978 |
| GB | 2078611 | * | 1/1982 |

* cited by examiner

*Primary Examiner*—Cynthia H. Kelly
*Assistant Examiner*—Camie S Thompson
(74) *Attorney, Agent, or Firm*—Knobbe Martens Olson & Bear LLP

(57) ABSTRACT

This invention relates generally to a pre-finished, moisture resistant and durable building material that is able to diffuse stress caused by variations in temperature and climate. One preferred embodiment of the building material includes a fiber cement substrate, at least one resin impregnated paper, and a stress-relieving elastomeric film between the fiber cement substrate and the resin impregnated paper, wherein the elastomeric film acts as a stress relaxer between the fiber cement substrate and the one resin impregnated paper.

50 Claims, 1 Drawing Sheet

PRE-FINISHED AND DURABLE BUILDING MATERIAL

CROSS-REFERENCE TO RELATED APPLICATION

This application claims the benefit of U.S. Provisional Application No. 60/166,513, filed Nov. 19, 1999.

BACKGROUND OF THE INVENTION

1. Field of the Invention

This invention relates to building materials, and more particularly, to a building material comprising a fiber cement substrate, a polymer film and a plurality of resin impregnated sheets that is both pre-finished and durable.

2. Description of the Related Art

Fiber cement in recent years has become popular for use as a building material instead of more conventional materials such as wood, metal and plastics. Fiber cement has better water resistance than wood and is more resistant to rotting, cracking or splitting than wood. Also, fiber cement does not rust like metal, and is more durable to weathering than plastics. For instance, fiber cement products such as James Hardie Building Products' HARDIPLANK® install just as easily as wood siding, but offer a lifetime of low maintenance. Fiber cement siding is a durable, attractive alternative to traditional wood composite, cedar, vinyl, brick or stucco sidings.

Despite these advantages, fiber cement may not always have the desired exterior look and feel for a particular application. Moreover, conventional fiber cement materials are often painted or subject to other types of post-production or on-site finishing to give the material its desired appearance and exterior protection. However, exposure of paint to natural weathering and other factors can lead to chalking of the surface and loss of polymer in the paint film. Paint surfaces are also very thin, generally on the order of one to two mils, and because of that are subject to chipping, peeling and scratching from surface abuse.

Laminates comprised of a core having a sheet laminate comprised of a plurality of resin impregnated paper sheets adhered to the core are known in the art. Known core materials include engineered wood panels such as MDF (medium density fiber board) and particle boards. These products may perform satisfactorily in dry areas, but in areas subject to moisture these products have a tendency to swell, which misaligns the edges of the structure.

U.S. Pat. No. 5,425,986 discloses a laminate structure comprising a core of fiber cementboard laminated to resin impregnated sheets. The differential dimensional movement of the core and the laminate through various environmental conditions can lead to induced stresses between the fiber cement and resin impregnated sheets which often leads to splitting of the core or delamination. This is exaggerated by environments which experience high moisture followed by periods of dryness or heat and low humidity.

Accordingly, what is needed is a building material incorporating the durability and moisture resistance of fiber cement while also having a desired exterior look and feel. In addition, what is needed is a building material having an exterior surface that is pre-finished and durable to scratch and wear, while also maintaining strong adhesion to the fiber cement, and does not split, crack or delaminate when exposed to severe environmental conditions or wet/dry cycling.

SUMMARY OF THE INVENTION

One embodiment of the present invention relates to a building material comprising a fiber cement substrate having a first side and a second side, at least one resin impregnated paper over at least one of the first and second sides, and a stress-relieving polymeric film between the fiber cement substrate and the at least one resin impregnated paper, the polymer film acting as a stress relaxer between the fiber cement substrate and the at least one resin impregnated paper.

In another embodiment, a film for joining fiber cement to a resin penetrated paper is provided. This film comprises a polymer adapted to balance stresses between the fiber cement and the resin penetrated paper.

In another embodiment, a method is provided for bonding a fiber cement substrate having a surface to at least one resin impregnated paper to form a building material. The method comprises coating at least a portion of the surface of the fiber cement substrate with a stress-relieving polymer film, the polymer film being capable of preventing delamination between the substrate and the at least one resin impregnated paper. The at least one resin impregnated paper is pressed against the polymer film and the substrate.

DETAILED DESCRIPTION OF THE PREFERRED EMBODIMENTS

Figure 1:
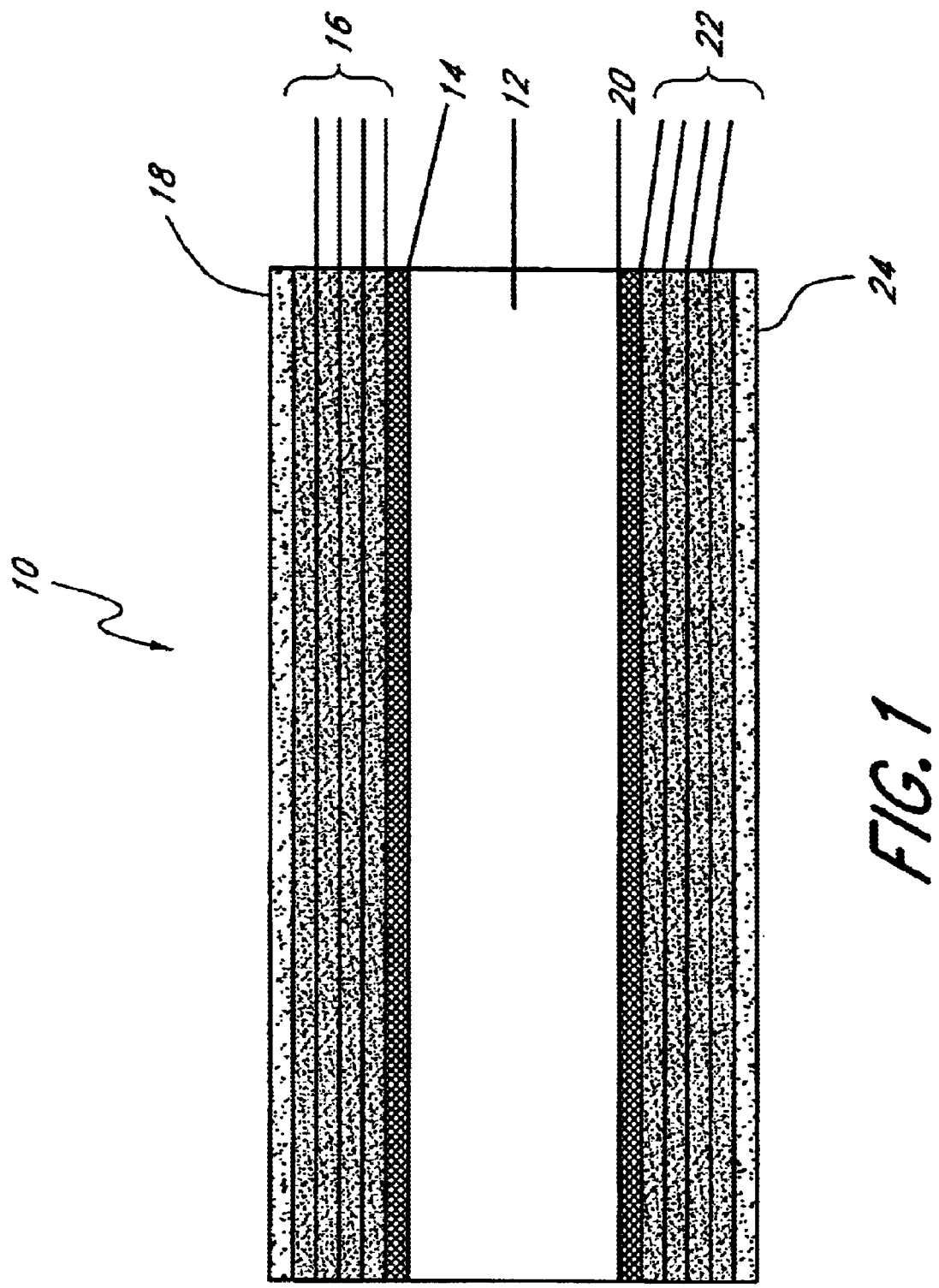
FIG. 1 is a cross-sectional view of a building material incorporating a fiber cement core having a plurality of resin impregnated papers laminated thereto according to one embodiment of the invention.

The preferred embodiments of the present invention relate to a pre-finished, moisture resistant and durable building material, preferably comprising-laminating fiber cement to one or a plurality of resin penetrated papers or sheets such as FORMICA®. In one embodiment, a pre-finished and durable building material is provided. In another embodiment, a polymeric coating or film is provided between resin penetrated sheets and a substrate. In another embodiment, a process for bonding the resin penetrated sheets to the substrate is provided.

The pre-finished building material preferably combines three components: (1) a substrate, (2) a polymer film or coating, and (3) resin penetrated papers. These components formed together provide a building construction material that is both pre-finished and durable. The resin penetrated papers may be provided on either one side of the substrate or both sides.

The substrate is most preferably fiber cement, but may also be wood, metal such as aluminum, concrete or other cementitious material, plastic such as polyvinyl chloride, composite material such as fiber reinforced plastics, engineered wood material such as hardboard or oriented strand board and gypsum board. In one embodiment, the fiber cement substrate is about 20% to 60% Portland cement, about 20% to 70% ground silica sand, about 0% to 12% cellulose fiber, and about 0% to 6% select additives such as mineral oxides, mineral hydroxides and water. Platelet or fibrous additives, such as, for example, wollastonite, mica, glass fiber or mineral fiber, may be added to improve the thermal stability of the fiber cement. The dry density fiber cement sheet is typically about 1.3 to 1.4 g/cm$^3$ but can be modified by pressing the material to dry densities up to 2.0 g/cm$^3$ or by addition of density modifiers such as unexpanded or expanded vermiculite, perlite, clay, shale or low bulk density (about 0.06 to 0.7 g/cm$^3$) calcium silicate hydrates or aeration.

The polymeric film is preferably polyurethane, acrylic, acrylic-styrene, polyester, polyether, polyvinyl and their modified films. Other films that may be used include but are not limited to films formed from thermosetting polymers and thermoplastic polymers, such as epoxy, polyamide, polyimide, polysulfide, silicon based polymer, natural polymers such as starch. The film may be an individual film with or without an adhesive on its surface, or may be a film formed from water based solution, solvent based solution or 100% solid polymers. In one embodiment, the thickness of the film is from about 0.2 mil to 5 mil.

The polymeric film is preferably flexible, with a glass transition temperature $T_g$ preferably between about −90° C. and 50° C., more preferably below 0° C., with good strength. The polymeric film advantageously has good adhesion to both fiber cement and resin penetrated sheets such as FORMICA®. Alternatively, when a separate adhesive is placed on one or both sides of the polymeric film, this adhesive should have good adhesion to the fiber cement and/or resin penetrated sheet.

The cellulose paper is preferably penetrated with resin of melamine-formaldehyde and phenol-formaldehyde, and may also be treated by other polymer resins, such as polyester. The thickness of the penetrated paper in one embodiment is from about 0.05 mm to 1 mm. The amount of resin in the paper is preferably from about 10% to 70%.

The process is preferably to laminate the resin penetrated papers, the polymer film and the substrate together all at the same time (direct method). Another process that may be used laminates the resin penetrated papers first, and then laminates this sheet of laminated papers, the polymer film and the substrate together (indirect method).

The invention relates in one embodiment to laminating resin impregnated papers such as FORMICA® to a fiber cement core. Lamination may occur at different pressures, and may be accomplished by direct and indirect lamination as discussed above. The invention also relates to the product of FORMICA® or similar materials laminated to fiber cement.

One problem experienced with laminating resin impregnated papers to fiber cement without a specially selected polymeric film is that the laminate suffers from delamination. For instance, after melamine-formaldehyde (MF) and phenol-formaldehyde (PF) impregnated papers are pressed in a pressure machine, the resin will cure and the lamination will have a much larger dimensional movement than the fiber cement panel under heat and moisture. Because of the differential movement, the lamination of resin impregnated paper to fiber cement will delaminate under dry conditions, high humidity or with heating up as the forces on the material tear the lamination apart.

The preferred embodiments of the present invention overcome this problem by developing a method to treat the surface of fiber cement by using a polymer coating or film to successfully stop the delamination on FORMICA® laminated fiber cement whether the product is made from direct or indirect lamination. The polymer coating is preferably a non-rigid, stress-relieving material, and is more preferably an elastomeric material, even more preferably having the properties described above, that acts as a stress relaxer to relieve the stress between the fiber cement and the resin impregnated sheets. Laminates incorporating this coating are less susceptible to delamination and/or splitting or cracking.

Optionally, the fiber cement substrate may be pressed flat in the green state or sanded after curing to obtain a smooth surface on which a minimal number (e.g., 1 or 2) of resin impregnated papers may be bonded incorporating a coating, as described above. By machining or sanding the surface smooth prior to coating, this enables a fewer number of resin impregnated papers to be used to obtain the desired flat finish. Such product has the differential stresses between the fiber cement and the resin impregnated papers more adequately balanced to resist cracking or splitting of the core.

FIG. 1 illustrates one embodiment of a building material constructed in accordance with the present invention. This building material 10 includes a substrate 12, which in one embodiment is a fiber cement panel, the panel 12 having a first side and a second side. On the first side of the panel 12, a first layer of elastomeric adhesive 14 is provided, such as described above. A plurality of resin impregnated papers 16 is preferably provided over the elastomeric adhesive 14. In the embodiment shown, four layers 16 of phenol-formaldehyde impregnated papers are provided. Over the layers 16 a layer of melamine-formaldehyde penetrated paper 18 is preferably provided.

On the second side of the panel 12, a second layer of elastomeric adhesive 20 is provided. As with the first side, in one embodiment a plurality of resin impregnated papers 22, more preferably four layers of phenol-formaldehyde impregnated papers, are provided over the second layer of elastomeric adhesive 20. A layer of melamine-formaldehyde penetrated paper 24 is preferably provided over the layers 22.

The elastomeric material used for the adhesives 14, 20 preferably can be stretched and pressed without damaging the elastomeric material under limited force. The elastomeric material preferably recovers to its original shape after relieving of the force. In one embodiment, the elastomeric material used has an elongation between about 20% and 1200%, more preferably between about 100% to 1000%. The modulus of elasticity of the material at 100% elongation is preferably between about 10 to 10,000 psi, more preferably about 50 to 8,000 psi.

It will be appreciated that the embodiment shown in FIG. 1 is purely exemplifying, and thus, other types of resin impregnated papers in varying quantities may be provided. Thus, in one embodiment, resin impregnated papers may be provided only to one side of the panel 12. In addition, each side may preferably have a fewer number or larger number of phenol-formaldehyde penetrated papers, for example, 0 to 4. In the embodiment above, it will also be appreciated that additional layers of melamine-formaldehyde penetrated papers may be provided, for example 1 to 3.

Further examples of a building material 10 similar to that shown in FIG. 1 are described below.

EXAMPLE 1

One example of a building material using a direct lamination method according to this invention is herein described. A fiber cement panel having a thickness of ¼" is roller-coated with Bayhydrol PR 240 (40% of solid) on both sides of the panel. Bayhydrol 240 PR is a water-based polyurethane elastomeric adhesive available from Bayer Corp. of Pittsburgh, Pa. One layer of melamine-formaldehyde (MF) resin impregnated paper and four layers of phenol-formaldehyde (PF) impregnated papers are put on top of the coated fiber cement panel, and one layer of MF impregnated paper and one layer of PF impregnated paper is put on the bottom of the coated fiber cement. The layers and the panel together are pressed at 350° F for 5 min at pressure of 750 psi. The laminated panel is then placed in an oven of 60° C. for 3 days.

The resulting building material showed no delamination. A building material fabricated in accordance with the embodiments described above was subjected to three types of delamination tests:

1. The building material was placed in a room temperature desiccate (humidity less than 10%) for 2 days.

2. The building material was placed in a dry oven at 60° C. for 3 days.

3. The building material was subjected to 5 dry/wet cycles, such as 24 hours in an oven at 60° C. and 24 hours soaked in water.

It has been found that when no polymer film is placed between the fiber cement and FORMICA®, delamination occurs in about 2 hours in an oven at about 60° C. With the film, no delamination occurred under the above-described three tests.

EXAMPLE 2

Another example uses an indirect lamination method for laminating decorative paper to fiber cement. The phenol-formaldehyde impregnated papers and melamine-formaldehyde impregnated papers were pressed in hot press with high pressure (for example, about 1500 psi) or with medium pressure (for example, about 1000 psi) to get paper based decorative laminates. The thickness of the paper based laminate may vary from about 0.5 mm to 3 mm.

A fiber cement sheet having a thickness of about ¼" was coated with WC-0682-M-449 adhesive (H. B. Fuller, St. Paul, Minn.) by using a brush. WC-0682-M-449 is a water-based acrylic elastomeric adhesive. The solid percentage of the adhesive was about 48%. The amount of glue on fiber cement was about 7 g/ft$^2$ (wet based weight, i.e. 7 g of 48% adhesive) for each side. A thickness of about 0.5 mm of paper based laminate was put on both sides of the coated fiber cement. The paper based laminates and fiber cement core were pressed at about 50 psi for about 1 min. The temperatures of top platen and bottom platen in the press were about 350° F.

The laminated panel was then placed in different environment conditions for testing adhesion and delamination. The laminated panel showed excellent adhesion and had no delamination. As a comparison, instead of using an elastomeric adhesive, urea-formaldehyde adhesive, such as described in U.S. Pat. No. 5,425,986, was used to make the same laminates. Delamination occurred at the fiber cement core when the laminate was dried in oven of 60° C. for about 2 hours.

In general, the preferred embodiments of the present invention enable a building material to take advantage of the durability and other properties of fiber cement while pre-finishing the material by laminating the fiber cement to resin impregnated sheets such as FORMICA® or similar material. The pre-finished surface eliminates the need for painting, either at the building construction site or paint priming and/or paint finishing coating in the factory. FORMICA® and similar materials have the advantage over common interior and exterior house paints (such as acrylic paints) of being more durable to surface scratch and wear. Moreover, the elastomeric polymer film between the fiber cement and the FORMICA® or similar material relieves stresses therebetween and prevents delamination of the building material.

The embodiments illustrated and described above are provided merely as examples of certain preferred embodiments of the present invention. Various changes and modifications can be made from the embodiments presented herein by those skilled in the art without departure from the spirit and scope of the invention.

What is claimed is:

1. A building material, comprising:
a fiber cement substrate having a first side and a second side;
at least one resin impregnated paper over at least one of said first and second sides; and
a stress-relieving elastomeric adhesive film between said fiber cement substrate and said at least one resin impregnated paper, said elastomeric adhesive film acting as a stress relaxer between said fiber cement substrate and said at least one resin impregnated paper.

2. The building material of claim 1, wherein the fiber cement substrate comprises cellulose fibers.

3. The building material of claim 1, wherein the elastomeric adhesive film is selected from the group consisting of polyurethane, acrylic, acrylic-styrene, polyester, polyether, polyvinyl and their modified films, epoxy, polyamide, polyimide, polysulfide, silicon based polymer and natural polymers.

4. The building material of claim 1, wherein the elastomeric adhesive film has an elongation between about 20% and 1200%.

5. The building material of claim 4, wherein the elastomeric adhesive film has an elongation between about 100% and 1000%.

6. The building material of claim 1, wherein the elastomeric adhesive film has a modulus of elasticity at 100% elongation of between about 10 and 10,000 psi.

7. The building material of claim 6, wherein the elastomeric adhesive film has a modulus of elasticity at 100% elongation of between about 50 and 8,000 psi.

8. The building material of claim 1, wherein the elastomeric adhesive film has a glass transition temperature between about −90 and 50° C.

9. The building material of claim 1, wherein the resin impregnated paper includes a cellulose paper penetrated with resin selected from the group consisting of melamine-formaldehyde and phenol-formaldehyde.

10. The building material of claim 1, wherein a resin impregnated paper is laminated to both said first and second sides.

11. The building material of claim 1, wherein the elastomeric adhesive film is adhered to the substrate.

12. The building material of claim 11, wherein the elastomeric adhesive film is further adhered to the at least one resin impregnated paper.

13. A building material, comprising:
a fiber cement substrate having a first side and a second side;
at least one resin impregnated paper over at least one of said first and second sides, said at least one resin impregnated paper comprising at least one layer of phenol-formaldehyde penetrated paper over the first side of the fiber cement substrate, and at least one layer of melamine-formaldehyde penetrated paper over the at least one layer of phenol-formaldehyde penetrated paper; and
a stress relieving elastomeric film between said fiber cement substrate and said at least one resin impregnated paper, said elastomeric film acting as a stress relaxer between said fiber cement substrate and said at least one resin impregnated paper.

14. The building material of claim 13, wherein the fiber cement substrate comprises cellulose fibers.

15. The building material of claim 13, wherein the elastomeric film is selected from the group consisting of polyurethane, acrylic, acrylic-styrene, polyester, polyether, polyvinyl and their modified films, epoxy, polyamide, polyimide, polysulfide, silicon based polymer and natural polymers.

16. The building material of claim 13, wherein the elastomeric film has an elongation between about 20% and 1200%.

17. The building material of claim 16, wherein the elastomeric film has an elongation between about 100% and 1000%.

18. The building material of claim 13, wherein the elastomeric film has a modulus of elasticity at 100% elongation of between about 10 and 10,000 psi.

19. The building material of claim 18, wherein the elastomeric film has a modulus of elasticity at 100% elongation of between about 50 and 8,000 psi.

20. The building material of claim 13, further comprising an adhesive on a surface of the elastomeric film.

21. The building material of claim 13, wherein a resin impregnated paper is laminated to both said first and second sides.

22. The building material of claim 13, comprising a plurality of layers of phenol-formaldehyde penetrated papers over the first side of the substrate.

23. The building material of claim 22, comprising at least one layer of phenol-formaldehyde penetrated paper over the second side of the substrate and at least one layer of melamine-formaldehyde penetrated paper over the at least one layer of phenol-formaldehyde penetrated paper.

24. The building material of claim 22, comprising a plurality of phenol-formaldehyde penetrated papers over the second side of the substrate, and at least one layer of melamine-formaldehyde penetrated paper over the plurality of phenol-formaldehyde penetrated papers.

25. A building material, comprising:
  a fiber cement substrate having a first side and a second side;
  at least one resin impregnated paper over at least one of said first and second sides, the at least one resin impregnated paper having a higher dimensional movement under heat and moisture than the substrate; and
  a stress-relieving elastomeric film between said fiber cement substrate and said at least one resin impregnated paper, said elastomeric film acting as a stress relaxer between said fiber cement substrate and said at least one resin impregnated paper.

26. The building material of claim 25, wherein the fiber cement substrate comprises cellulose fibers.

27. The building material of claim 25, wherein the elastomeric adhesive film is selected from the group consisting of polyurethane, acrylic, acrylic-styrene, polyester, polyether, polyvinyl and their modified films, epoxy, polyamide, polyimide, polysulfide, silicon based polymers and natural polymers.

28. The building material of claim 25, wherein the elastomeric adhesive film is a water based polyurethane elastomeric adhesive.

29. The building material of claim 25, wherein the elastomeric adhesive film is a water based acrylic elastomeric adhesive.

30. The building material of claim 25, wherein the elastomeric adhesive film has an elongation between about 20% and 1200%.

31. The building material of claim 30, wherein the elastomeric adhesive film has an elongation between about 100% and 1000%.

32. The building material of claim 25, wherein the elastomeric adhesive film has a modulus of elasticity at 100% elongation of between about 10 and 10,000 psi.

33. The building material of claim 32, wherein the elastomeric adhesive film has a modulus of elasticity at 100% elongation of between about 50 and 8,000 psi.

34. The building material of claim 25, wherein the elastomeric adhesive film has a glass transition temperature between about −90 and 50° C.

35. The building material of claim 25, wherein the substrate is bonded to the at least one resin impregnated paper by a process comprising:
  applying the elastomeric film in a continuous manner along the surface of the substrate, the elastomeric layer being capable of preventing delamination between the substrate and the at least one resin impregnated paper; and
  pressing at least one resin impregnated paper against the elastomeric layer and the substrate.

36. The building material of claim 25, wherein the elastomeric adhesive film is adhered to the substrate.

37. The building material of claim 36, wherein the elastomeric adhesive film is further adhered to the at least one resin impregnated paper.

38. A building material, comprising:
  a fiber cement substrate having a first side and a second side;
  at least one resin impregnated paper over at least one of said first and second sides; and
  a stress-relieving film between said fiber cement substrate and said at least one resin impregnated paper, said stress-relieving film having an elongation between about 20% and 1200%.

39. The building material of claim 38, wherein the fiber cement substrate comprises cellulose fibers.

40. The building material of claim 38, wherein the stress-relieving film is selected from the group consisting of polyurethane, acrylic, acrylic-styrene, polyester, polyether, polyvinyl and their modified films, epoxy, polyamide, polyimide, polysulfide, silicon based polymer and natural polymers.

41. The building material of claim 38, wherein the stress-relieving film has a glass transition temperature between about −90 and 50° C.

42. The building material of claim 38, wherein the stress-relieving film has an elongation between about 100% and 1000%.

43. A building material, comprising:
  a fiber cement substrate having a first side and a second side;
  at least one resin impregnated paper over at least one of said first and second sides; and
  a stress-relieving film between said fiber cement substrate and said at least one resin impregnated paper, said stress-relieving film having a modulus of elasticity at 100% elongation of between about 10 and 10,000 psi.

44. The building material of claim 43, wherein the fiber cement substrate comprises cellulose fibers.

45. The building material of claim 43, wherein the stress-relieving film is selected from the group consisting of polyurethane, acrylic, acrylic-styrene, polyester, polyether, polyvinyl and their modified films, epoxy, polyamide, polyimide, polysulfide, silicon based polymer and natural polymers.

46. The building material of claim 43, wherein the stress-relieving film has a glass transition temperature between about −90 and 50° C.

47. The building material of claim 43, wherein the stress-relieving film has a modulus of elasticity at 100% elongation of between about 50 and 8,000 psi.

48. A laminate structure comprising:
a fiber cement substrate having a first side and a second side;
at least one resin impregnated paper over at least one of said first and second sides; and
a stress-relieving elastomeric film continuous between said fiber cement substrate and said at least one resin impregnated paper, wherein said elastomeric film provides sufficient stress-relief to prevent delamination between the fiber cement substrate and the at least one resin impregnated paper after the laminate structure is incubated at a temperature of about 60° C. for not less than three days.

49. A laminate structure comprising:
a fiber cement substrate having a first side and a second side;
at least one resin impregnated paper over at least one of said first and second sides; and
a stress-relieving elastomeric film continuous between said fiber cement substrate and said at least one resin impregnated paper, wherein said elastomeric film provides sufficient stress-relief to prevent delamination between the fiber cement substrate and the at least one resin impregnated paper after storing said laminate structure in a desiccated environment having a relative humidity of not more than 10% for a period of not less than two days.

50. A laminate structure comprising:
a fiber cement substrate having a first side and a second side;
at least one resin impregnated paper over at least one of said first and second sides; and
a stress-relieving elastomeric film continuous between said fiber cement substrate and said at least one resin impregnated paper, wherein said elastomeric film provides sufficient stress-relief to prevent delamination between the fiber cement substrate and the at least one resin impregnated paper after subjecting said laminate structure to at least 5 serial wet and dry cycles wherein said dry cycle comprises incubating said laminate structure for about 24 hours at about 60° C. and said wet cycle comprises soaking said laminate structure in water for 24 hours.

* * * * *